No. 812,333. PATENTED FEB. 13, 1906.
A. W. EDSTROM.
SIEVE.
APPLICATION FILED JULY 6, 1905.
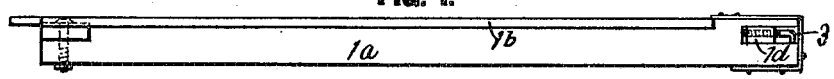
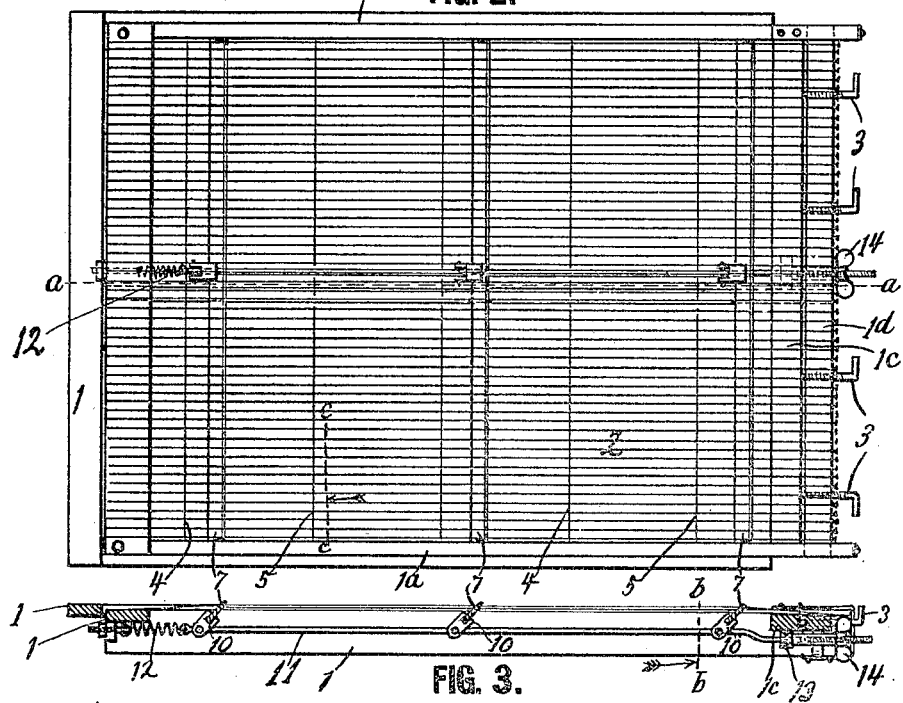
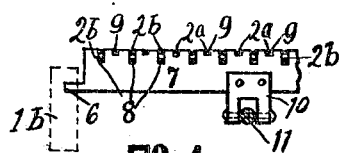
WITNESSES:
D. E. Carlsen.
E. C. Carlsen
INVENTOR:
Axel W. Edstrom.
BY his ATTORNEY:
A. M. Carlsen.

UNITED STATES PATENT OFFICE.

AXEL W. EDSTROM, OF STANTON, IOWA.

SIEVE.

No. 812,333.

Specification of Letters Patent.

Patented Feb. 13, 1906.

Application filed July 6, 1905. Serial No. 268,563.

*To all whom it may concern:*

Be it known that I, AXEL W. EDSTROM, a citizen of the United States, residing at Stanton, in the county of Montgomery and State of Iowa, have invented certain new and useful Improvements in Sieves; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in sieves of the class made of parallel wires and which are largely used in flour-mills; and the object is to provide a sieve of said class in which the spaces between the wires may be readily increased or decreased, as circumstances may make desirable, also to provide such sieve with means for holding the wires parallel and for stretching them. These and other objects I attain by the novel construction and arrangement of parts illustrated in the accompanying drawings, in which—

Figure 1 is a side or edge view, and Fig. 2 is a plan view, of my improved sieve. Fig. 3 is a sectional view on the line $a\ a$ in Fig. 2. Fig. 4 is a sectional view of a portion of Fig. 3 on the line $b\ b$ thereof. Fig. 5 is an enlarged portion near the left end of Fig. 3. Fig. 6 is a sectional view on the line $c\ c$ in Fig. 2.

Referring to the drawings by reference-numerals, 1 $1^a$ $1^b$ $1^c$ designate the frame of the sieve, and 2 the wires stretched on the frame and forming the sieve proper. The frame is of rectangular form and at one end has an extra end bar $1^d$, to which the wires are fastened and which is adjustable by means of screws 3 to and from the bar $1^c$, so as to thereby stretch the wires 2, which have their opposite ends secured to the bar 1. As best shown in Figs. 4 and 6, every other wire 2 or the wires $2^a$ form a set of wires connected together by cross-wires 4, while $2^b$ are connected together by the brace-wires 5 into a lower set. Below the wires 2 are journaled in the side bars of the frame, as at 6 in Fig. 4, the ends of cam bars or strips 7, having deep notches or clearings 8 for the wires $2^b$ and shallow notches 9 for the wires $2^a$, so that when the cams are tilted upward or toward the wires all the wires $2^a$ will be raised out of plane with the wires $2^b$, and thus increase the spaces between all the wires, as best shown in Figs. 4 and 5. The cams 7 are tilted simultaneously by the rocker-arms 10 and a rod 11, connecting them together. Said rod is normally held with the cams inactive by means of a coil-spring 12, securing one end of the rod to the frame. The other end of the rod is passed through a guide 13, beyond which it has a thumb-nut 14, adapted to pull the rod against the resistance of the spring 12 until the cams are tilted to the desired extent.

From the above description it will be seen that I provide a wire sieve whose coarseness or fineness may be easily regulated.

Having thus described my invention, what I claim, and desire to secure by Letters Patent, is—

1. A wire sieve having two sets of parallel wires, one of said sets comprising every other wire, said sets being normally in the same plane, and means for throwing one set out of plane with the other to thereby increase the spaces between the wires, said sets having cross-wires embracing each of the parallel wires to steady them against lateral displacement.

2. A wire sieve having two sets of parallel wires, one of said sets comprising every other wire, said sets being normally in the same plane, and means for throwing one set out of plane with the other to thereby increase the spaces between the wires, said sets having cross-wires embracing each of the parallel wires to steady them against lateral displacement, and means for stretching the parallel wires, substantially as set forth.

3. A wire sieve having two sets of parallel wires, one of said sets comprising every other wire, said sets being normally in the same plane and means for throwing one set out of plane with the other to thereby increase the spaces between the wires, said means consisting of cam-bars journaled in the frame of the sieve and having deep notches for every other wire and shallow notches for every other wire and means for rocking the cam-bars simultaneously.

4. A wire sieve having two sets of parallel wires, one of said sets comprising every other wire, said sets being normally in the same plane, and means for throwing one set out of plane with the other to thereby increase the spaces between the wires, said means consisting of cam-bars journaled in the frame of the sieve and having deep notches for every other wire and shallow notches for every other wire and means for rocking the cam-bars simultaneously, said rocking means consisting of rocker-arms on the cams, a rod pivotally connecting said rocker-arms together, a thumb-nut on one end of the rod and a retracting spring at the other end.

In testimony whereof I affix my signature in presence of two witnesses.

AXEL W. EDSTROM.

Witnesses:
C. A. ASKLOF,
E. M. COPPAGE.